United States Patent [19]

Grathoff et al.

[11] Patent Number: 5,013,201
[45] Date of Patent: May 7, 1991

[54] TRAVELING CONVEYOR ARRANGEMENT

[75] Inventors: Hartmut Grathoff, Wendelstein; Werner Hübel, Nuremberg, both of Fed. Rep. of Germany

[73] Assignee: MAN Gutehoffnungshütte, Oberhausen, Fed. Rep. of Germany

[21] Appl. No.: 512,828

[22] Filed: Apr. 23, 1990

[30] Foreign Application Priority Data

Apr. 22, 1989 [DE] Fed. Rep. of Germany ....... 3913359

[51] Int. Cl.$^5$ .............................................. B65G 67/60
[52] U.S. Cl. .............................. 414/139.4; 198/861.3; 198/626.1
[58] Field of Search ............... 414/139.4, 140.2, 140.3, 414/140.4, 140.8; 198/626.1, 627, 628, 586–589, 313, 839, 842, 861.3

[56] References Cited

U.S. PATENT DOCUMENTS

| 4,230,221 | 10/1980 | Beresinsky | 198/626 |
| 4,382,502 | 5/1983 | Beresinsky | 198/628 |
| 4,537,302 | 8/1985 | Gsponer et al. | 198/626 |
| 4,585,384 | 4/1986 | Richard et al. | 198/626 |

FOREIGN PATENT DOCUMENTS 3447498 1/1987 Fed. Rep. of Germany .

Primary Examiner—David A. Bucci
Assistant Examiner—Brian K. Dinicola
Attorney, Agent, or Firm—McGlew & Tuttle

[57] ABSTRACT

A traveling continuous conveyor for bulk materials for unloading ships and removing heaps of bulk material. A steep conveyor is provided including a carrying belt (3) and a cover belt (4) which are integrated in the conveyor device. The bulk material is cast by two casting drums (8a and 8b) into the lower gap between the carrying belt (3) and the cover belt (4), in any position of the support frame relative to a surface of the bulk material. Computer-controlled linear drives (6, 15, 17, 20, and 22) are provided, with which the position of the casting drums 8a and 8b relative to each other and to the layer of bulk material to be removed, e.g., height adjustment to the inclination plane of the bulk material, is facilitated. Among other things, adjustment of the four-bar linkage consisting of connecting rod mechanisms (9, 11a and 11b) and axes (12a and 12b) of the lower deflecting pulleys (13a and 13b) of the carrying and cover belts (3 and 4), longitudinal displacement of the deflecting pulleys 13b and 13c) of the cover belt (4), which are arranged in a support profile (14), as well as adjustment of the height of the casting drums (8a and 8b) during the swiveling of the steep conveyor are provided. The casting drums and the belts of the steep conveyor can be replaced with a small amount of mounting work as a consequence of the overhung arrangement of the corresponding pulleys and support roller brackets.

7 Claims, 5 Drawing Sheets

TRAVELING CONVEYOR ARRANGEMENT

FIELD AND BACKGROUND OF THE INVENTION

The present invention pertains to a traveling continuous conveyor for bulk materials including a boom with a boom conveyor belt and a travelling frame which is hinged to the boom and which is adjustable in height by means of a tilting mechanism in the form of a linear drive. A steep conveyor with a cover belt conveyor is suspended from the free end of the boom and may be pivoted in a vertical plane around a horizontal axis by means of a first linear drive. Conveyor belts, which together form a covered belt conveyor, are led around deflecting pulleys or rollers at the ends of the covered belt conveyor with the conveyor belt of the boom preferably forming the carrying belt. A material take up member is provided in the form of two casting drums that can be driven in opposite directions and which are mounted in a support frame for a take-up zone of the steep conveyor.

Such a conveyor for bulk materials is known from [West] German Patent No. 34,47,498. However, the prior-art casting drums are arranged in fixed positions relative to one another and relative to the support frame of the steep conveyor.

SUMMARY AND OBJECTS OF THE INVENTION

It is an object of the present invention to further develop a continuous conveyor of this class, so that the material to be received and conveyed is continuously cast into the take-up zone of the support frame relative to a surface of the material to be conveyed. Also its an object that the casting drums, which can be shaped differently for different materials to be conveyed, as well as the belts of the steep conveyor, which are subject to wear, can be replaced with the smallest installation effort.

According to the invention, a support frame is provided with three connecting rod mechanisms one of which serves for the hinged connection of the casting drums to each other and the other two of which serve for the hinge connection of the casting drums to the axis of the lower deflecting pulleys which are located adjacent to the casting drums. The axis of the lower cover belt deflecting pulley is adjustable in height so that the cover belt conveyor forms a unit consisting of the lower and upper cover belt deflecting pulleys. This unit is relatively displaceable in a direction parallel to the support frame by a second linear drive. A four-bar linkage is defined by the connection rod mechanisms and the axis of the lower deflecting pulleys and is adjustable by a third linear drive. The third linear drive is hinged on both sides to the support frame and the connecting rod. The leading casting drum is arranged higher than the other casting drum such that the casting drums catch at least approximately equal amounts of material to be conveyed. Each of the casting drums as well as the cover belt and the carrying belt deflecting pulleys are connected to the support frame and the support profile and are mounted in a side by side or an overhung arrangement. A fourth linear drive is provided associated with a tilting mechanism which may be controlled, depending upon the deflection of the steep conveyor from the vertical position, by a first control device so that the path of movement of the casting drums is at a constant height parallel to the inclination plane of the material being conveyed. Linear drives are provided for adjusting the four-bar linkage and for height adjustment of the leading casting drum. These linear drives are controlled depending on the deflection of the steep conveyor from the vertical position by second control device such that during pendular movement of the steep conveyor at right angles to the direction of the movement of the continuous conveyor, the casting drums always assume the same position relative to the inclination plane of the material being conveyed The stream of bulk material is always directed at least approximately perpendicularly to the connecting rod mechanism connecting the casting drums and into the take up zone of the steep conveyor.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
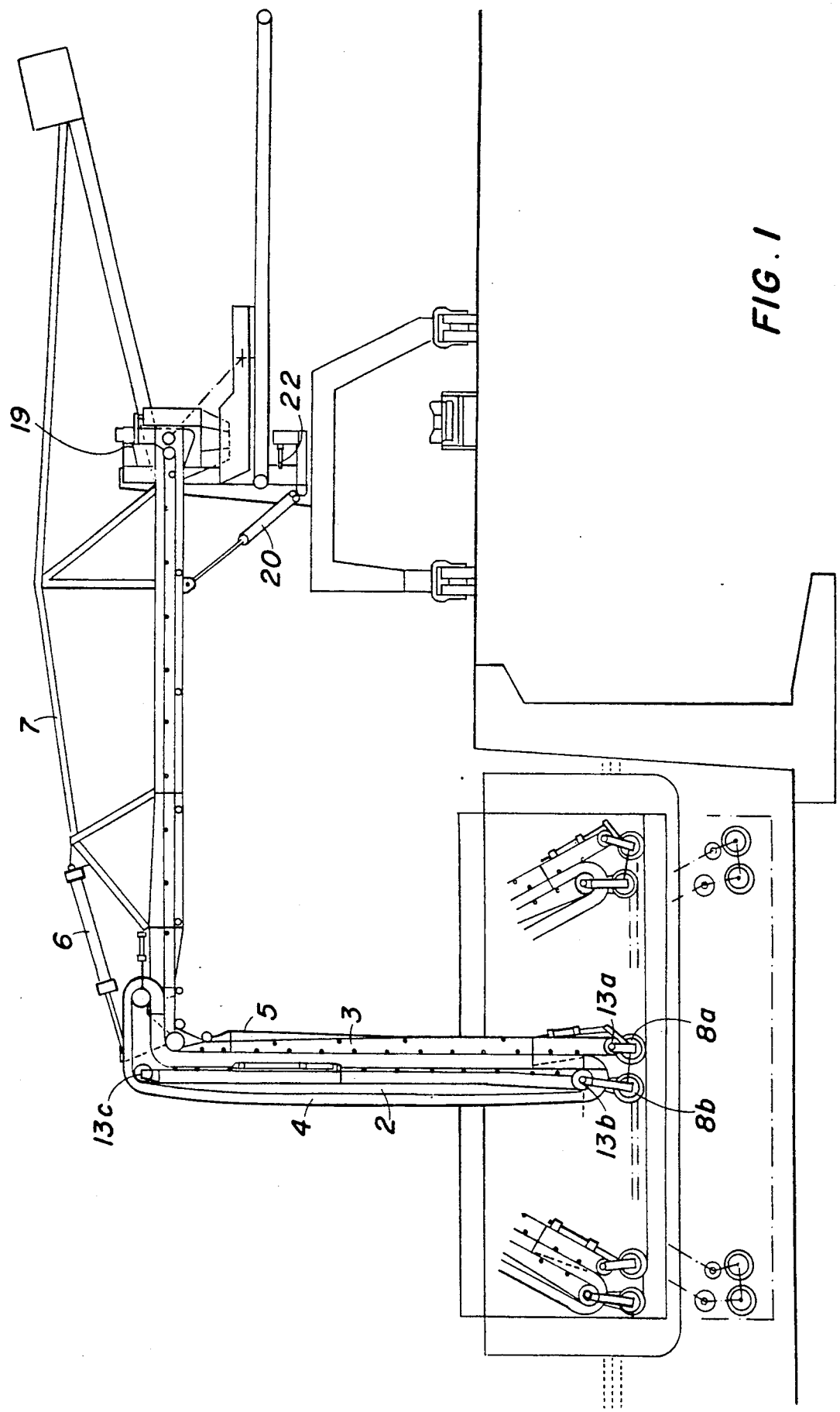
FIG. 1 is a side view of a continuous conveyor according to the invention as a ship unloading conveyor.
Figure 2:
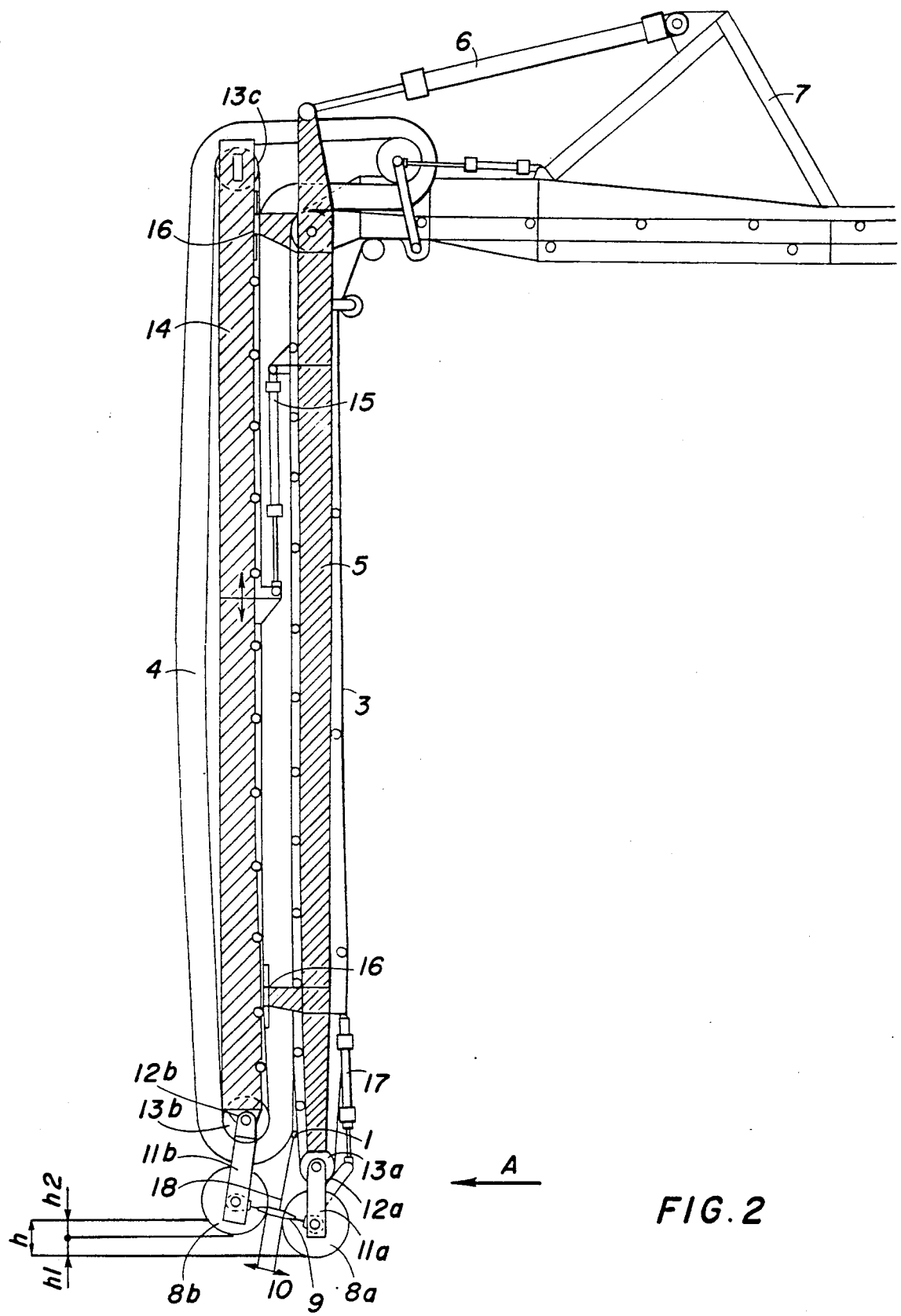
FIG. 2 is a side enlarged view showing a detail steep conveyor with a material take-up member.
Figure 3:
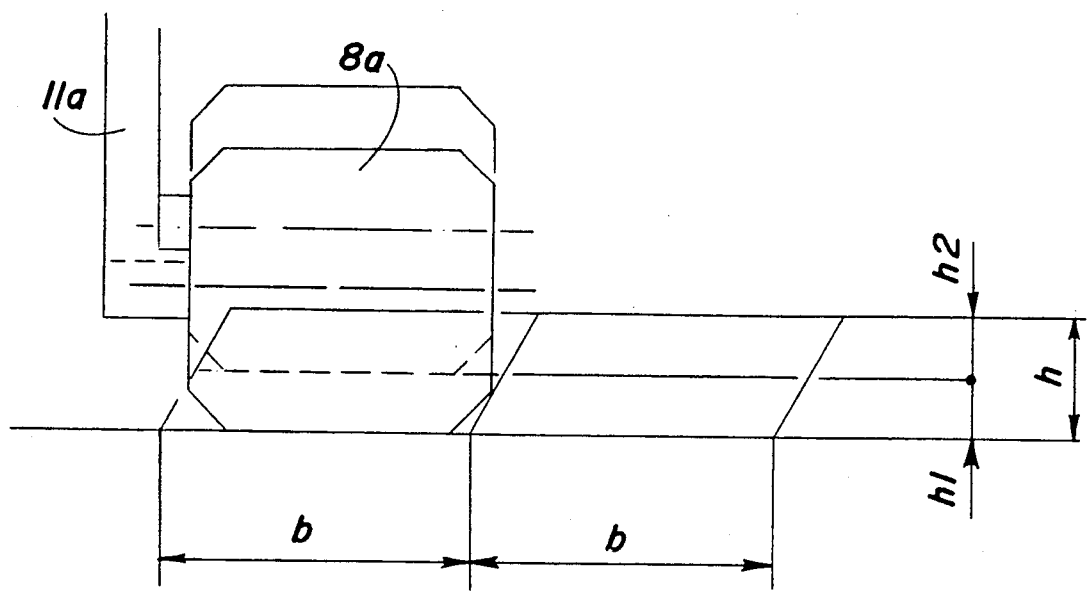
FIG. 3 is a broken away view of the material take-up member viewed in the direction of arrow A in FIG. 2.
Figure 4:
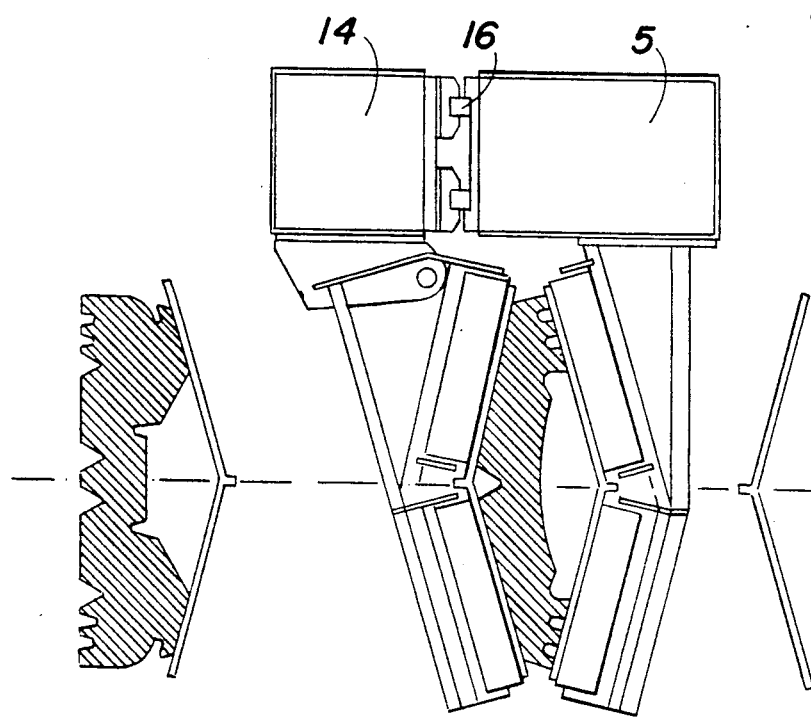
FIG. 4 is an enlarged view drawing a detail of the guiding of the support profile relative to the support frame; and, FIG. 5 is a side view of the continuous conveyor as a heap removing device.
Figure 5:
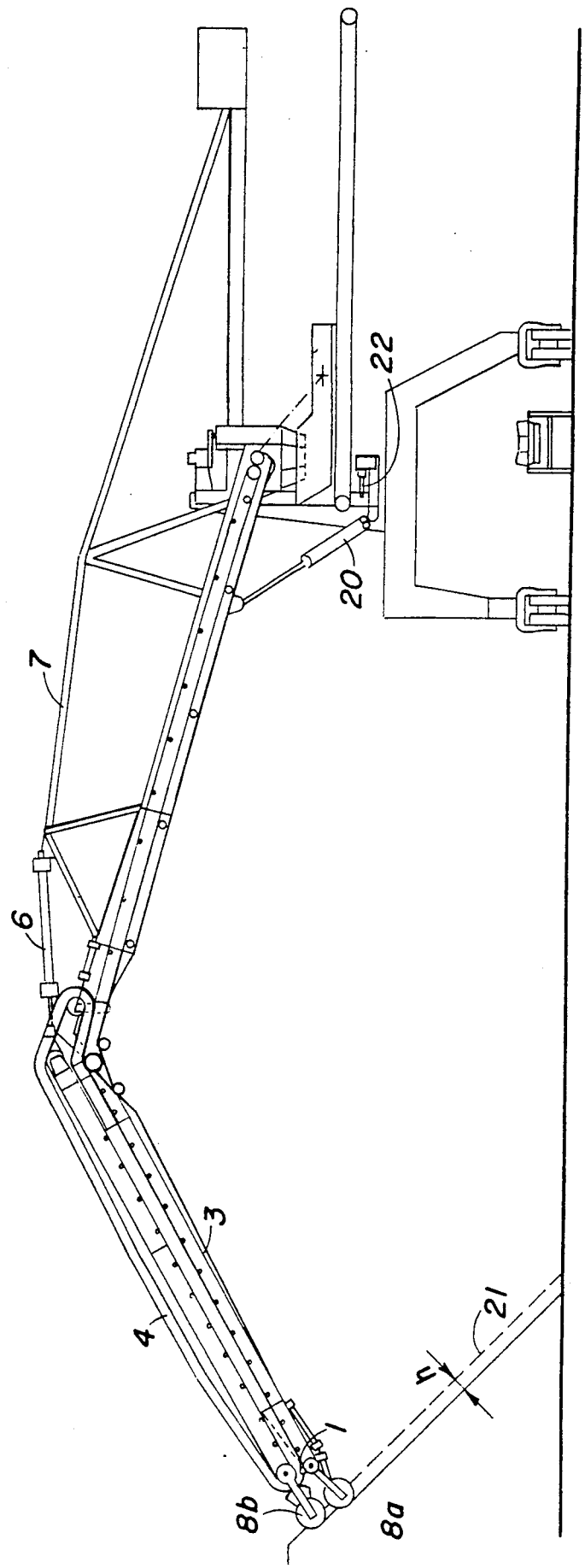
Figure 6:
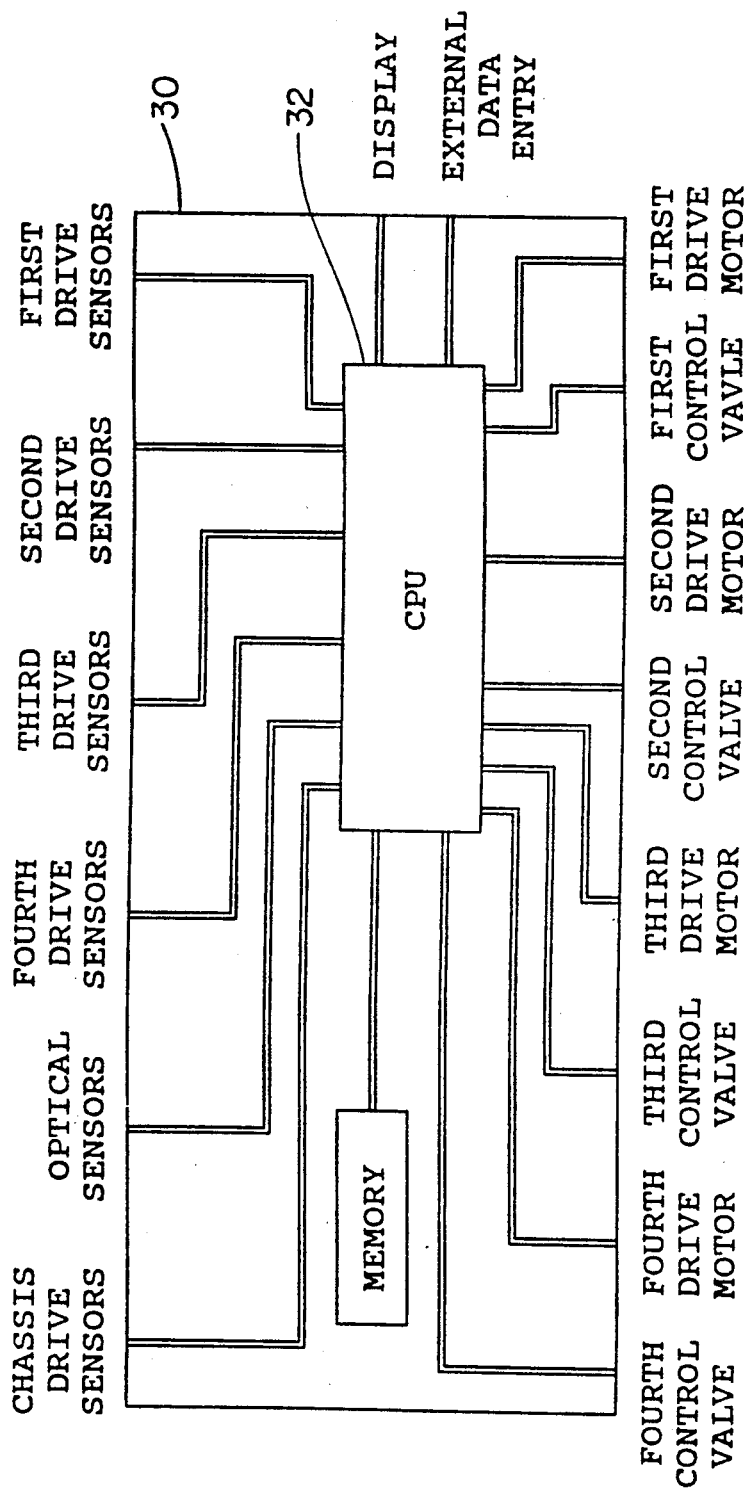
FIG. 6 is a schematic view of the electronic computer and it's connections.

In the known manner, the conveyor for bulk materials has a substructure traveling on wheels, a swiveling superstructure supported on it via a rotary connection, a conveyor belt boom that can be raised and lowered by pivoting around a horizontal axis, a steep conveyor that conveys the bulk material in the upward direction and can be pivoted on the boom around a horizontal axis extending in parallel to the longitudinal axis of the ship, and a material take-up member which takes up the bulk material and throw it into the higher take-up zone 1 of the steep conveyor.

The steep conveyor has a covered belt conveyor 2, which is preferably designed as a foam covered belt conveyor, with a carrying belt 3 driven clockwise and with a cover belt 4 (foam belt) driven counterclockwise at equal velocity, as well as a support frame 5.

The support frame 5 can be swiveled out of the vertical middle position around the vertical axis through about +30° via a first linear drive 6.

The carrying belt 3 is preferably also the conveyor belt in the boom 7.

The steep conveyor is preceded by the material take-up member generating the upward stream of bulk material, which has two casting drums 8a and 8b or scoop wheels of essentially identical design, which rotate in opposite directions and can be driven by motors and are connected to each other via a rod 9, connecting rod or similar coupling members. The rod 9 may be of constant length; however, the rod 9 is preferably designed as an extensible rod in order to decrease or increase the gap 10 between the casting drums 8a and 8b. FIG. 1 shows the covered belt conveyor 2 in the topmost position relative to support frame 5. The second casting drum 8b is the leading drum in the position shown.

The casting drums 8a and 8b are pivotally connected to the first and second axes of rotation 12a and 12b of lower cover belt deflecting pulley 13b and lower carrying belt deflecting pulley 13a via rigid first and second rods 11a and 11b. The length of rods 11a and 11b is selected to be such that damage to foam belt 4 and the carrying belt 3 by direct contact with the casting drums will be avoided and the shortest possible distance between the casting drum and the material take-up zone 1 of the steep conveyor will be obtained.

The height of the casting drum 8b can be adjusted via the second rod 11b. To achieve this, the lower cover belt deflecting pulley 13b is integrated via a support profile member 14, together with the upper cover belt deflecting pulley 13c, to form a compact unit, which is displaceable in parallel to the second linear drive 15 relative to the support frame 5.

The support frame 5 and the support profile 14 are connected via at least one linear bearing 16 or the like, which permits linear displacement without interfering with the axis-parallel connection of the two components.

The four-bar linkage defined by the axes of the deflecting pulleys 13a and 13b and the axes of rotation of the casting drums 8a and 8b is adjusted by means of a third linear drive 17, which is arranged pivotally between said first rod 11a and the support frame 5.

The casting drum 8b, which is the leading drum viewed in the direction A of movement in which the bulk material is removed, is arranged higher by a constant amount $h_1$ measured in the vertical direction, regardless of the instantaneous angular position of the steep conveyor. The strip of bulk material caught by the second casting drum 8a has a height $h_1$. The casting drums are dipped into the material being conveyed to such an extent that the strip of material that is caught by casting drum 8b has a height $h_2$, with $h_1$ and $h_2$ being approximately equal, so that approximately equal amounts of material are caught by two casting drums 8a and 8b.

The casting drums 8a and 8b rotate in opposite directions and preferably at approximately equal speeds. The stream of material being conveyed, thus generated by casting drums 8a and 8b, has approximately the direction 18.

In the ideal case, the stream of material being conveyed is delimited by the two tangents to the casting drum crown lines, which tangents are at right angles to the line connecting the two casting drum axes. In other words, direction 18 is also the middle perpendicular to said rod 9. The gap width 10 is to be selected so that the product of the velocity of the stream times the width of the casting drum times the gap width 10 will give the amount being conveyed. The stream of material being conveyed is bundled best in this case.

Because the deflecting pulleys of the support frame 5 maintain a constant distance between their axes during the adjustment of the four-bar linkage, the carrying belt 3 can be extended in the boom 7 without interruption.

Because the length of carrying belt 3 does not change, passive follow-up of a belt pulley 19 arranged at the free end of the boom 7 is not necessary.

The overhung arrangement of all the pulleys and support roller brackets as well as of the casting drums, which are connected to the support frame 5 and the support profile 14, has appreciable advantages. Especially since the cover belt 4, and the carrying belt 3 are definitely parts subject to wear, it is important to ensure that the belts can be pulled off and replaced with new belts already made endless in a simple manner. The casting drums, which are shaped differently for different materials to be conveyed, shall also be able to be replaced with ease. The linear drives 15 and 17 can be arranged in favorable positions, and only one linear drive is needed at any one time.

The boom 7 can be moved through about 15° from the horizontal position in the upward and downward directions around a horizontal axis that is parallel to the direction of travel of the bulk material conveyor or parallel to the longitudinal axis of the ship. This is achieved with a fourth linear drive 20, which is arranged between boom 7 and the superstructure of the continuous conveyor.

The superstructure can be pivoted through approximately 90° around a vertical axis to swivel out of the out-of-operation position, in which the boom 7 is pivoted in the direction of travel of the continuous conveyor, into the operating position and vice versa.

During operation, the superstructure (including the boom) is swiveled through a few degrees around a vertical axis relative to the direction of travel of the continuous conveyor, in parallel to the surface of the material being conveyed, as will be explained in greater detail below. The swiveling movement is performed by a fifth linear drive 22.

A fourth linear drive 20 of the tilting mechanism can be controlled, depending on the deflection of the steep conveyor from the vertical position, by a first control means preferably incorporated in a computer 30 so that the path of movement of the casting drums occurs at a constant height parallel to the inclination plane of the material being conveyed). The computer 30 has a CPU; unit 32 comparing nominal values with actual values, with the nominal values being preset and the actual values being determined by sensors that measure the displacement of the displaceable parts of first and fourth linear drives 6 and 20. The output signal of the first control means, which compares nominal values, with actual values is used as a control signal for the drive motor and the hydraulic cylinder control value of the fourth linear drive 20.

The linear drives 15 and 17 are controlled, depending on the deflection of the steep conveyor from the vertical middle position, by a second control means also preferably incorporated in computer 30, so that in such a use as a ship unloading conveyor, casting drums 8a and 8b are always in the same position relative to the ship during the pendular movement across the ship's hold. (The position of casting drums relative to the steep conveyor is consequently changing continuously.) In addition, linear drives 15 and 17 are controlled, depending on the deflection of the steep conveyor from the vertical middle position, so that the stream of material being conveyed, which is generated by casting drums 8a and 8b, is always directed into take-up zone 1 of the steep conveyor. This can be achieved, for example, by means of optical sensors and a regulating device by detecting the direction of the stream of material being conveyed and continuously correcting it into the direction of the take-up zone of the steep conveyor.

However, it is better to determine the path of travel of the casting drums 8a and 8b empirically or by calculation and to enter into the second control means the function of the two cylinder displacements of linear drives 15 and 17, depending on the inclination of the steep conveyor, as the program for providing the nominal values.

The nominal values are compared with corresponding actual values in a CPU unit 32 with the output signals used to control the linear drives 15 and 17 (feed back control). To determine the actual value signals, the travel of the movable parts of the linear drives 15 and 17 is detected by means of sensors.

The casting drums 8a and 8b move at the feed speed v in the direction A and catch, during their movement across the ship's hold, a strip of material with a height h and a width b, wherein b approximately corresponds to the width of the casting drums 8a and 8b. In the normal case, the amount of material being conveyed, h*b*v (h times b times v), is maintained at a constant value by an automatic control device. However, in exceptional cases when the last layer height is smaller, e.g., during the removal of residues of material from the ship bottom, the automatic control device is able to maintain the amount of material being conveyed at a constant value by correspondingly increasing the value of v.

Due to the bulk material being removed strip by strip, the amount of material taken up is uniform, regardless of the flow characteristics of the material being delivered. Once one strip has been removed, the ship unloading conveyor can be moved by the width of one layer. The height of the casting drums 8a and 8b is subsequently adjusted in order for the leading casting drum to be higher during the return travel as well.

However, the conveyor for bulk material can also be moved at a crawling speed in parallel to the longitudinal axis of the ship during the pendular movement of the steep conveyor across the ship's hold.

In this case precisely remove the strip of bulk material that is at right angles to the direction of travel of the bulk material conveyor, the traveling movement of the bulk material conveyor must be compensated by a swiveling movement of the superstructure of the bulk material conveyor through a few degrees.

To achieve this, the chassis of the bulk material conveyor controls the swiveling mechanism via a third control means also preferably incorporated in a computer 30, in the required manner. The distance traveled by the bulk material conveyor is determined via sensors and—after corresponding adjustment to the swiveling angle—it is sent as a control signal to the linear drive of the swiveling mechanism.

The linear drives 6, 15, 17, 20, and 22 are preferably hydraulic piston-cylinder assembly units each with a directly mounted control valve and a built-in or laterally mounted displacement sensor and a force sensor.

The material take-up member moves along a straight horizontal line extending in the direction of the width of the ship or at right angles to the direction of travel of the bulk material conveyor. This line is generated by the simultaneous pendular movement of the steep conveyor, tilting of the boom, slight swiveling of the superstructure, as well as crawling travel of the bulk material conveyor.

The bulk material conveyor operates fully automatically, aside from the basic settings to be performed by the equipment operator, by the use of the electronic computer 30. The control is similar to that of an "intelligent" robot.

All hydraulic cylinders (piston-cylinder units) have displacement sensors, as a result of which the instantaneous position of the device and all speeds are reported to the computer.

The movements of the bulk material conveyor are designed so that the ship cargo is unloaded layer by layer, and each layer, strip by strip. The strips being arranged at right angles to the longitudinal axis of the ship. The material take-up member performs a meandering movement in a horizontal plane.

The continuous conveyor for bulk materials according to the present invention can be used not only to unload ships, but, for example, also to take up heaps of bulk materials.

Especially due to the possibility of driving the linear drives by means of electronic components, it is possible to travel along the angle of repose 21 of heaps, so that the material taken up is cast into the take-up zone 1 at height h.

Electronic control also makes it possible to use the continuous conveyor to travel along any surfaces due to the four-bar linkage adapting itself to the local inclination plane of the zone to be removed.

While a specific embodiment of the invention has been shown and described in detail to illustrate the application of the principles of the invention, it will be understood that the invention may be embodied otherwise without departing from such principles.

What is claimed is:

1. A travelling continuous conveyor for a bulk material, comprising:

a travelling frame; a boom hinged to said travelling frame; a boom conveyor belt supported by said boom; linear tilting adjustment means connected to each of said traveling frame and said boom for tilting said boom with respect to said travelling frame to adjust the height of a free end of said boom; a steep conveyor structure supporting a covered belt conveyor, said steep conveyor structure being pivotally connected at said free end of said boom; first linear drive means connected to said boom and connected to said steep conveyor structure for pivoting said steep conveyor structure around a horizontal axis; deflecting pulleys positioned at ends of said steep conveyor structure supporting conveyor belts of said covered belt conveyor, said conveyor belts being led around said deflecting pulleys, said covered belt conveyor having a carrying belt which is preferably connected to said boom conveyor belt and a cover belt; first and second casting drums mounted in a support frame defining a take-up zone at an end of said steep conveyor structure, a three connecting rod mechanism including a first connecting rod mechanism providing a hinged connection, connecting said first and second casting drums to each other, a second connecting rod mechanism connecting said first casting drum to an axis of a lower deflecting pulley and a third connecting rod mechanism connecting said second casting drum to an axis of another lower deflecting pulley, said lower deflecting pulleys being positioned adjacent said casting drums, an axis of each of said lower deflecting pulleys being adjustable in height, said cover belt forming a unit including a support profile member, said lower deflecting pulleys and upper deflecting pulleys, a unit being displaceable in a direction parallel to said support frame by a second linear drive; a third linear drive connected to a side of said support frame and connected to one of said second and third connecting rod mechanisms for adjusting the position of said first, second and third adjusting rod mechanisms to change a relationship between the position of the axes of said casting drums with respect to axis of said lower deflecting pulleys, said first, second and third connecting rod mechanism positioning a leading one of said casting drums higher than the other casting drums such that the two casting drums catch at least approximately equal amounts of material to be conveyed, said first and second casting drums as well as pairs of said lower deflecting pulleys being provided in an overhung arrangement; first control means for controlling said linear tilting adjustment means depending upon the deflection of said steep conveyor structure from a vertical position such that movement of said casting drums occurs at a constant height parallel to an inclination plane of a material being conveyed; and, second control means connected to said third linear drive and said second linear drive for adjusting said first, second and third connecting rod mechanism linkage and for height adjustment of said leading casting drum independent upon the deflection of said steep conveyor structure from a vertical position such that during a pendular movement of said steep conveyor structure at right angles to the direction of movement of the boom conveyor, the casting drums always assume an identical position relative to an inclined plane of a bulk material being conveyed and to provide that a stream of bulk material is always directed at least approximately perpendicularly to said first connecting rod mechanism into the take up zone of the steep conveyor structure.

2. A conveyor for bulk materials according to claim 1, wherein said support frame and said support profile member are designed as a box element with the axes of said deflecting pulleys of said cover belt and said carrying belt being laterally connected to said support frame and said support profile member in a rigid and torsion-proof manner.

3. A conveyor for bulk material according to claim 1, wherein said support frame and said support profile member are connected by at least one linear drive.

4. A conveyor for bulk material according to claim 1, wherein said travelling frame has a chassis and a super structure which may be pivoted about a vertical axis by means of a swivelling mechanism, said superstructure carrying said boom and said steep conveyor structure, said chassis travels simultaneously at a relatively low velocity at right angles to said pendular movement of said steep conveyor structure boom, said swivelling mechanism including a fifth linear drive controlled via a third control means for compensating said travelling of said chassis, said support frame and said casting drums to move along a straight line at right angles to the direction of movement of the continuous conveyor.

5. Conveyor for bulk materials according to claim 4, wherein each of said first control means, said second control means and said third control means comprise a computer which accesses nominal values in the form of a program and which receives actual values from displacement sensors of each of said linear drives.

6. A conveyor for bulk material according to claim 5, wherein said nominal values of the position-dependant forces of the linear drives are preprogrammed in a computer and the actual value of such forces is continuously determined with force sensors associated with the linear drives in a position-dependant manner and compared to the nominal values, and one of warnings, reversal of movement, or switching off is induced when preset differences between nominal and actual values are exceeded.

7. A traveling continuous conveyor for material comprising:

a traveling frame;

a conveyor belt boom having a first and second end, said first end attached to said traveling frame in a pivotable manner about vertical and horizontal axes;

a swivel drive for rotating said conveyor belt boom about a vertical axis;

a boom drive for rotating said conveyor belt boom about a horizontal axis;

a steep conveyor structure having a first structure end and a second structure end, said first end of said steep conveyor being pivotably attached to said second end of said conveyor belt boom, said steep conveyor structure having a carrying belt defining a take up end and a discharge end and a cooperating cover belt defining a take up end and a discharge end for conveying the material vertically and at angles away from vertical;

a first drive for pivoting said steep conveyor with respect to said boom conveyor;

a second drive for positioning said cover belt take up end into a plurality of positions extending in front of and behind said take up end of said carrying belt;

a material take-up member having a plurality of casting drums for feeding the material into said take up end of said steep conveyor, and a plurality of linkages having pivotable ends, said linkages connecting said plurality of casting drums to each other and to said second structural end of said steep conveyor structure;

a third drive for adjusting the angular position of said material take-up member with respect to said steep conveyor; and, control means for receiving position information of each of said drives and said traveling frame, and sending commands to each of said drives to reposition said drives, said control means having a processing unit for calculating new positions of said drives.

* * * * *